United States Patent [19]
Harris

[11] 3,960,473
[45] June 1, 1976

[54] DIE STRUCTURE FOR FORMING A SERRATED ROD

[75] Inventor: Thomas Harris, Chesterland, Ohio

[73] Assignee: The Glastic Corporation, South Euclid, Ohio

[22] Filed: Feb. 6, 1975

[21] Appl. No.: 547,550

[52] U.S. Cl. .............................. 425/467; 72/274; 72/467
[51] Int. Cl.² ......................................... B29C 23/00
[58] Field of Search ................ 264/177 R, 134, 137; 425/380, 381, 376, 461, 465, 466, 467; 72/467, 276, 274; 249/134

[56] References Cited
UNITED STATES PATENTS
1,398,412   11/1921   Barkschat .......................... 249/134
3,509,427   4/1970    Perrone et al. ..................... 264/134

FOREIGN PATENTS OR APPLICATIONS
321,017   10/1929   United Kingdom .................. 72/467

Primary Examiner—Francis S. Husar
Assistant Examiner—Mark Rosenbaum
Attorney, Agent, or Firm—McNenny, Farrington, Pearne & Gordon

[57] ABSTRACT

A pultrusion die for forming elongated, serrated, fiber-reinforced articles is disclosed. The die comprises a die block having a cylindrical cavity therethrough and a plurality of cylindrical rods arranged in a cylindrical array about the sidewall of the cavity. Each rod contacts two adjacent rods at parallel lines of contact which are located along the length of each rod and which define inwardly facing cylindrical arcs of less than 180° so that the rods lock each other against non-axial movement. The inwardly facing arcs together define a serrated die cavity.

4 Claims, 3 Drawing Figures

DIE STRUCTURE FOR FORMING A SERRATED ROD

BACKGROUND OF THE INVENTION

This invention relates to pultrusion dies and, more particularly, to a die for forming longitudinally serrated, fiber-reinforced plastic rods used in the assembly of electric motors. In the manufacture of electric motors nonconducting rods are driven into the stator to hold the windings out of place while the varnish is being baked. Various types of rods have been employed, such as tapered wooden pegs, and fiber-reinforced, serrated rods. Serrated rods are desirable in that they can be molded by a pultrusion technique on an economical basis. The points of the serrations are abraded away as the rod is driven in place to form an effective wedge without tapering the rod, which would be impossible in a pultrusin technique. However, since the rod has an outside diameter of about 0.093 inch to about 0.187 inch, the pultrusion die must be extremely small, and therefore as a practical matter, it is not possible to machine the serrations into the die cavity.

Rather than machine the cylindrical inner surface of an elongated die, it has been proposed in U.S. Pat. No. 1,398,412 to make a serrated die cavity by locking together a plurality of axially extending staves having abutting sides disposed in radial planes and inner surfaces configured to provide longitudinal flutes in the surface of a generally cylindrical or rodlike member to be molded. Two or more such die block assemblies are joined on radially disposed parting planes. For a pultrusion die having the dimensions noted above, such an arrangement would be prohibitively expensive, due to the necessary precise machining of the nonparallel, radially disposed, abutting sides of the staves.

SUMMARY OF THE INVENTION

This invention provides a pultrusion die which is adapted to form an elongated, serrated, fiber-reinfoced plastic article. The article may be used as a wedge in the assembly of electric motors. The die comprises a die block having a cylindrical cavity extending therethrough and a plurality of cylindrical rods are arranged about the cavity wall with at least substantially all of the rods in contact with circumferentially adjacent rods so that the rods lock each other in place against inward radial displacement. The rods are locked in this manner, since the lines of contact on each rod define inwardly facing, cylindrical arcs of less than 180°. Those inwardly facing cylindrical arcs define the serrated die cavity. The cylindrical rods are held against axial displacement by apertured cover plates positioned at the ends of the die block. Each aperture provides a cylindrical opening which is spaced radially from the inwardly facing cylindrical arcs.

DETAILED DESCRIPTION OF THE INVENTION

Figure 2:
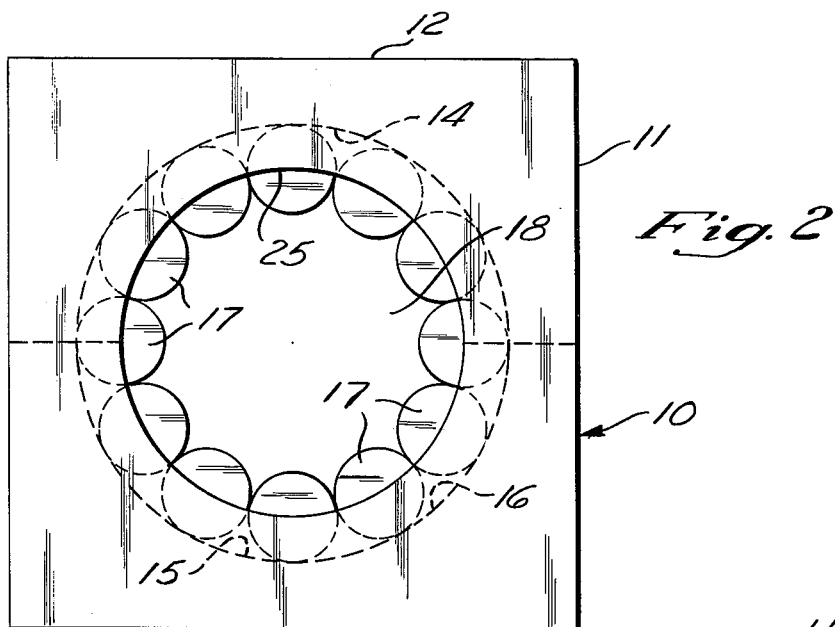
FIG. 2 is an end view of the die illustrated in FIG. 1.

Referring now to the drawing, there is illustrated a pultrusion die 10 which includes a die block 11. The die block 11 has separable body sections 12 and 13 each having a longitudinally extending semicylindrical cavity 14 and 15, respectively, therein, so that when the body sections 12 and 13 are joined as illustrated, the semicylindrical cavities 14 and 15 cooperate to form a cylindrical die cavity 16. A contiguous array of cylindrical rods 17 is provided in the cavity 16 to define a serrated opening 18 through the die. The rods 17 may be made from drill rods or the like.

Figure 3:
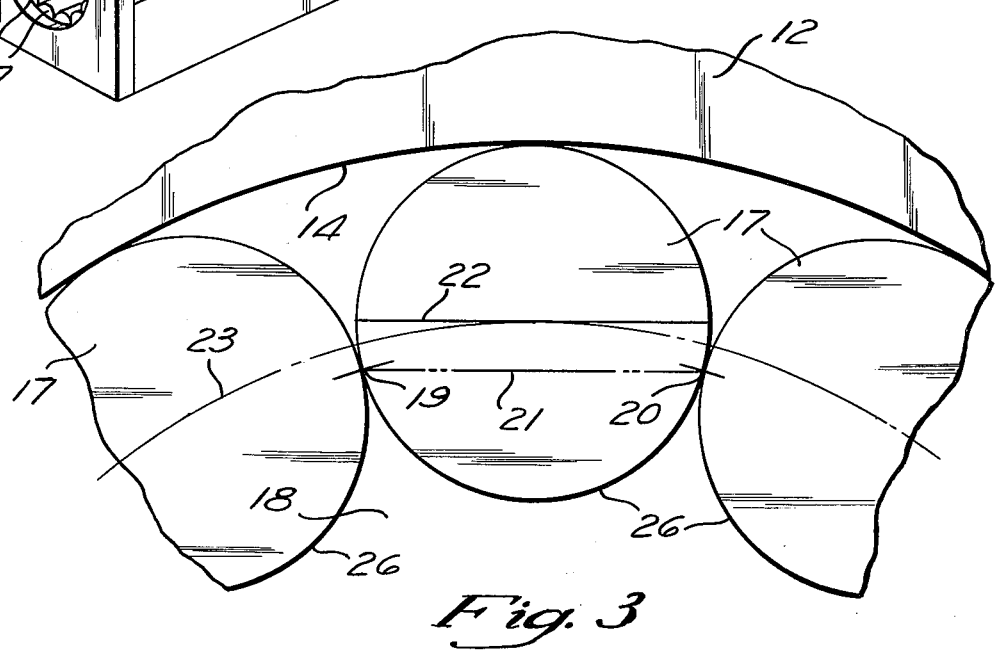
FIG. 3 is an enlarged end view of the die, with the end cover plate removed.

The rods 17 are locked against outward radial displacement by the cylindrical cavity 16 and against radially inward displacement by each other. As may be seen most clearly in FIG. 3, each rod contacts adjacent rods at parallel, axially extending lines 19 and 20, which are joined by a chordal plane 21 spaced inwardly from a diameter 22 tangent to a circle 23 which passes through the centers of all of the rods. Since the diameter 22 is greater than the chordal plane 21, all of the rods 17 are effectively locked in place. In order to assemble the rods in the die cavity 16, the rods are adhered to a central mandrel (not shown) by a suitable silicone adhesive and the assembly is inserted in one of the cavities. The die sections 12 and 13 are then clamped together and the central mandrel is removed. It should be appreciated that a slight tolerance may be provided between the rods 17 so long as the resulting width of the chordal plane 21 does not equal the diameter 22.

The rods are held against axial displacement by end plates 24 having cylindrical apertures 25 therein. The apertures 25 should have a diameter such that the apertures do not intersect any chordal plane 21 so that the apertures will not interfere with the segmented die cavity formed by the cylindrical arcs 26 of less than 180° and defined by the chordal planes 21.

Figure 1:
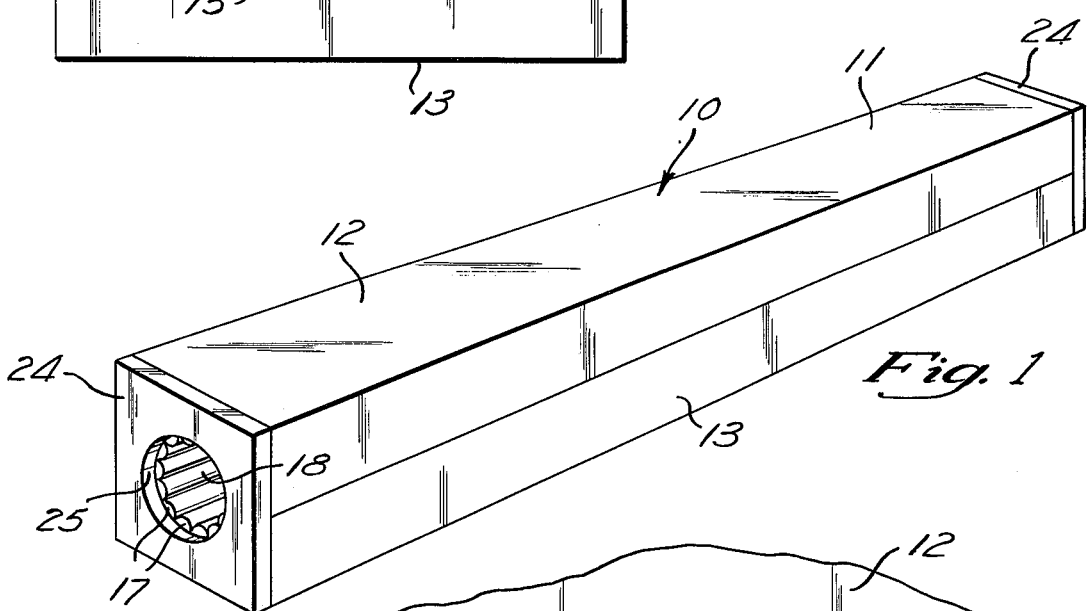
FIG. 1 is a perspective view of a pultrusion die according to this invention.

To form a serrated rod for use in the assembly of electrical motors, the pultrusion die 10 is placed in a standard fixture (not shown) which retains the die sections 12 and 13 and the end plates 24 in the positions illustrated in FIG. 1. Continuous strands of reinforcement, such as glass fiber roving, are impregnated with a suitable thermosetting resin and pulled through the serrated cavity 18. The cavity sets the shape of the stock and controls the resin content. The die 10 is heated and a cure is effected as the stock passes through the die. The cured serrated rod may then be cut to a desired length.

Although preferred embodiments of this invention are illustrated, it is to be understood that various other modifications and rearrangements of parts may be resorted to without departing from the scope of the invention claimed herein.

What is claimed is:

1. A pultrusion die for forming serrated, fiber-reinforced plastic articles, comprising a die block having a cylindrical cavity defined by a wall extending therethrough, a plurality of cylindrical rods arranged about the cavity wall with substantially all of said rods being in contact with circumferentially adjacent rods so that said rods lock each other in place against inward radial displacement and are fixed in place so that the inner peripiheral portions of said rods define a serrated die cavity.

2. A pultrusion die in accordance with claim 1, wherein each of said rods contacts circumferentially adjacent rods at lines of contact spaced radially inwardly from a rod diameter tangent to a circle passing through the centers of all of said rods.

3. A pultrusion die according to claim 2, wherein said rods are held against axial displacement by end plates abutting the ends of the die adjacent the ends of the rods and having apertures therein, the circumferences of which are spaced radially outwardly from said lines of contact.

4. A pultrusion die for forming elongated, serrated, fiber-reinforced plastic articles comprising a plurality of cylindrical rods, means supporting said plurality of cylindrical rods in a cylindrical array so that they are fixed in place, each of said rods contacting two adjacent rods at parallel lines of contact, said lines of contact being located along the length of each rod and defining inwardly facing cylindrical arcs of less than 180°.

* * * * *